_United States Patent_ [19]

McMath et al.

[11] 3,897,091

[45] July 29, 1975

[54] DRY-BREAK COUPLER

[75] Inventors: Jack A. McMath, Ft. Thomas, Ky.;
Charles W. Taylor, Batavia, Ohio

[73] Assignee: Dover Corporation, New York, N.Y.

[22] Filed: Sept. 14, 1973

[21] Appl. No.: 397,597

Related U.S. Application Data

[62] Division of Ser. No. 261,094, June 8, 1972, abandoned.

[52] U.S. Cl. ............ 285/311; 137/614.06; 285/320
[51] Int. Cl. .............................................. F16l 37/20
[58] Field of Search ............................ 285/311, 320

[56] References Cited
UNITED STATES PATENTS

| | | | |
|---|---|---|---|
| 3,278,205 | 10/1966 | Barlow | 285/311 |
| 3,409,316 | 11/1968 | Jewell | 285/311 |
| 3,445,127 | 5/1969 | Clarke | 285/320 X |
| 3,489,434 | 1/1970 | Haley | 285/311 |
| 3,722,549 | 3/1973 | Wilson et al. | 285/311 X |

FOREIGN PATENTS OR APPLICATIONS

| | | | |
|---|---|---|---|
| 1,232,952 | 5/1960 | France | 285/311 |
| 719,339 | 12/1954 | United Kingdom | 285/320 |
| 1,364,735 | 5/1964 | France | 285/320 |

_Primary Examiner_—Thomas F. Callaghan
_Attorney, Agent, or Firm_—John G. Schenk

[57] ABSTRACT

A dry-break coupler for connecting with tank truck adapters to permit loading the tank trucks through the bottom is disclosed. The coupler embodies a slidable inner cylinder which cooperates with a movable poppet so as to prevent inadvertent opening of the poppet when not engaged with the adapter. A pair of handles are double pivotally connected to the coupler housing. Linkages connected with the pivot points of the handle permit the coupler to be locked and unlocked from the adapters.

7 Claims, 5 Drawing Figures

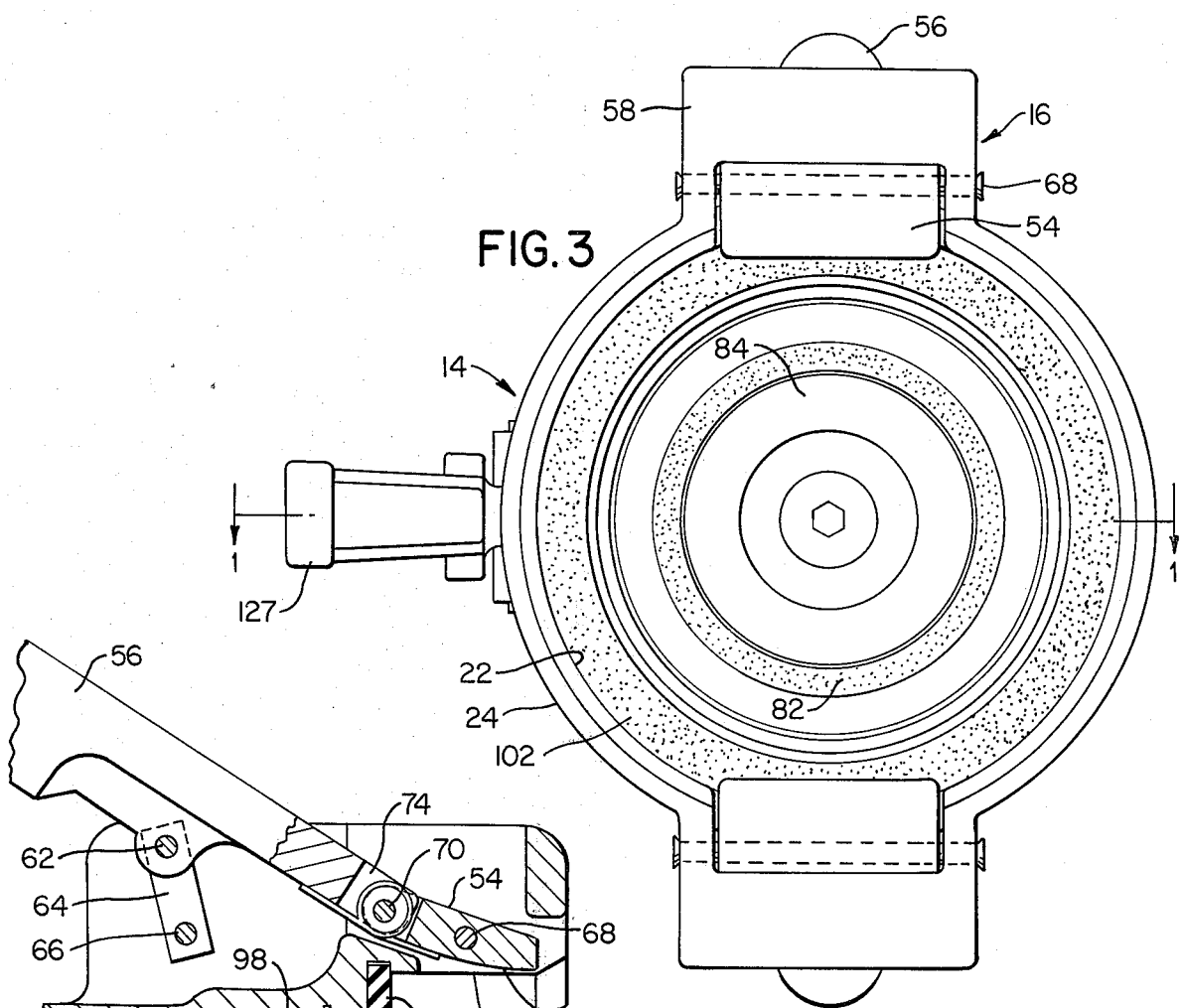
FIG. 3
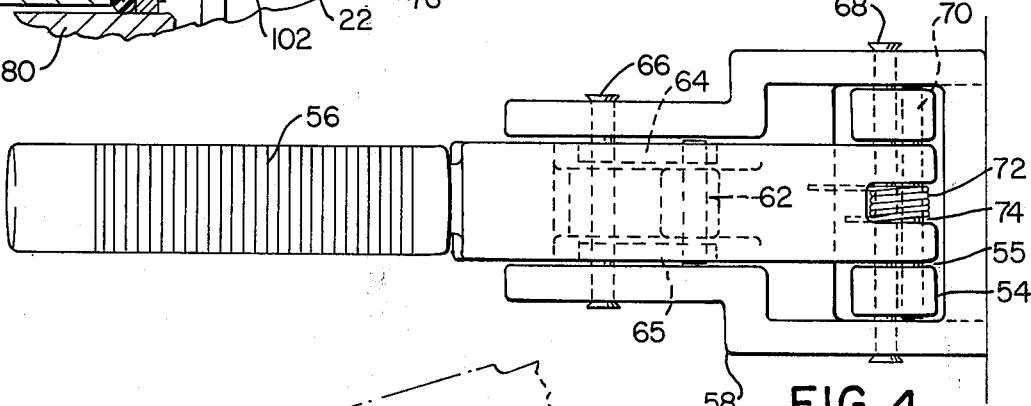
FIG. 2
FIG. 4
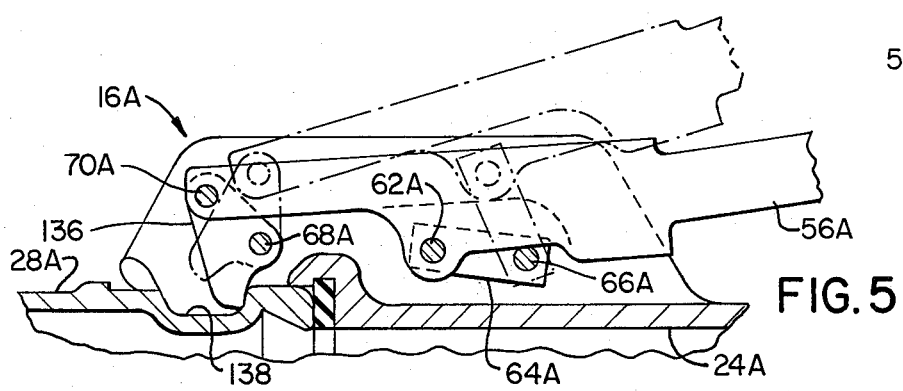
FIG. 5

DRY-BREAK COUPLER

This is a division of application Ser. No. 261,094, filed June 8, 1972, and now abandoned.

BACKGROUND OF THE INVENTION

This invention relates generally to coupling devices and more particularly to a valve coupling device having novel coupling members for use in a fluid system.

A problem with prior fluid coupling devices is that such devices have a tendency to lose a quantity of fluid during uncoupling. Where such coupling devices are used in fluid systems containing fluids which are of a dangerous nature, such loss of fluid is particularly undesirable. A further problem with the cooperating coupling members of many prior coupling devices is that it is possible with little effort to actuate such members while they are uncoupled and thereby lose fluid therefrom. In addition, some of such devices require complicated interlocks to guard against inadvertent opening and to assure that fluid will flow therethrough when the cooperating members of such couplers are fastened together in fluid flow relation. Such interlocks are expensive to produce and require complex operating procedures. Another problem with the prior devices is that elaborate latching and coupling members are required for joining the cooperating members together. Many such devices required that the cooperating members be precisely aligned to insure proper coupling.

Guertin et al., U.S. Pat. No. 3,473,569, issued Oct. 21, 1969, overcame many of the disadvantages of the prior devices. The present invention overcomes the deficiencies of the prior coupling devices and further is an improvement to the Guertin et al. coupler.

Accordingly, it is an object of this invention to provide a dry-break coupler in which the cooperating coupling members thereof can be easily and simply fastened together without requiring any special angular orientation of such members.

Another object of this invention is to provide a dry-break coupler having a high mechanical advantage.

Yet another object of this invention is to provide a dry break coupler having novel pivoted handles wherein the adapter may be pulled into the coupler for seating thereagainst during the closing of the handles.

SUMMARY OF THE INVENTION

This invention provides a dry break coupler for use in a fluid system. The dry-break coupler includes doubly pivoted handles connected to the coupler. Linking members are connected to the handle and coupler such that maximum advantage is taken of the high mechanical advantage during the movement of the handles from an open to a closed position so as to clamp and lock the coupler to an adapter. A telescoping inner cylinder cooperates with the coupler poppet valve to prevent loss of fluid through inadvertent opening of the poppet valve when the adapter is not connected to the coupler.

Other details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which:

FIG. 2 is a fragmentary view showing the handle of FIG. 1 in the unlocked position;

FIG. 3 is a top view of the coupler with the adapter removed;

FIG. 4 is an elevation view of the handle only; and

FIG. 5 is a fragmentary view showing a second embodiment of the handle of FIG. 2.

DESCRIPTION OF THE ILLUSTRATED EMBODIMENT

Figure 1:
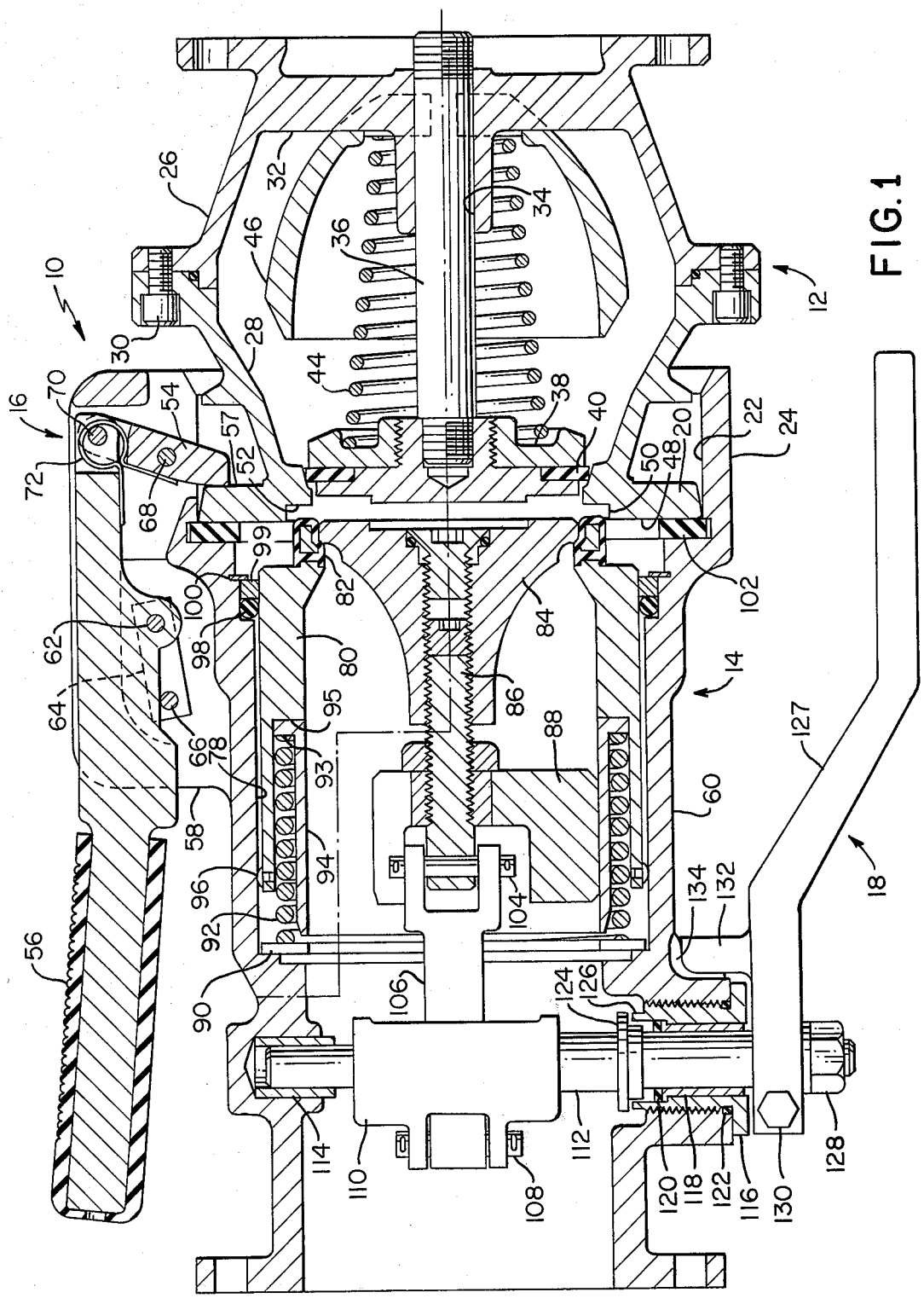
FIG. 1 is a cross-sectional view of the dry break coupler secured to the adapter and taken along line 1—1 of FIG. 3, a portion of the cross-sectional view being broken away to show the handle in the locked position.

While the various features of this invention are hereinafter illustrated and described as being particularly adaptable to fluid systems handling dangerous and flammable fluids, it is to be understood that various features of this invention can be utilized singly or in any combination thereof to provide coupling devices for use with any fluid whether in a liquid or gaseous state.

Therefore, this invention is not to be limited to only the embodiments illustrated in the drawings, because the drawings are merely utilized to illustrate one of the wide variety of uses of this invention.

Reference is now made to FIG. 1 of the drawings, which illustrates one exemplary embodiment of the improved dry-break coupler, which is designated generally by the reference numeral 10. The dry-break coupler 10 comprises a pair of cooperating cylindrical members 12 and 14 fastened together about a common axis by fastening means 16 complementally provided on such members. The members 12 and 14 are readily fastened together irrespective of their angular positions about such axis. Each member includes a valve means therein for sealing fluid therewithin upon unfastening thereof to provide a dry-break, i.e., the cooperating pair of members are taken apart essentially without spilling or losing fluid in any way. Actuating means 18 is provided in cylindrical member 14 for opening and closing the valve means provided within the dry-break coupler to control fluid flow through such coupler.

The coupler 10 comprises a male member or adapter 12 and a female member or coupler 14. Both the adapter 12 and the coupler 14 are generally right circular cylindrical in shape and the terminal end portion 20 of adapter 12 is received in a cooperating receiving bore 22 in an associated end portion 24 of coupler 14.

The adapter 12 is formed of a two-piece housing 26 and 28 secured together by suitable means such as screw 30. Housing 26 is formed with a bridge 32 therein, the bridge having a bore 34 therein arranged coaxially with the axis of the dry-break coupler 10. Mounted for sliding movement through the bore 34 is the stem 36 of a poppet valve 38. The poppet valve 38 is provided with a suitable sealing member 40 which engages in a sealing manner the chamfered surface 42 of the housing 28 when the poppet valve 38 is urged to the closed position by spring 44. The spring 44 acts between the poppet 38 and the bridge 32. A flow deflector 46 is attached to the bridge 32. When the poppet 38 is opened as will be explained hereinbelow, the poppet is moved to a position where the poppet 38 is adjacent the front of the deflector 46 so as to streamline the flow around the poppet when the coupler 10 is in the fluid flow condition. The terminal end portion 20 of the housing 28 is formed with a flat face or surface 48, a bore 50 and a flat face or surface 52. The face 52 forms a sealing face as will be explained hereinbelow.

The connecting of the adapter 12 to the coupler 14 is accomplished through the cooperative engagement of a pair of clamping pawls 54 with the surface 57 of the terminal portion 20. Movement of the clamping pawls 54 is controlled by a doubly pivoted handle 56. Although there are two handles and associated components, only one such handle and linkages will be described herein, it being understood that the other handle and linkages are the same.

Referring now to FIGS. 1, 3 and 4, it is seen that the handle 56 is pivotally mounted between a pair of supports 58. The supports 58 form part of the housing 60 of the coupler 14.

The handle 56 is pivotally connected by a pin 62 to a pair of links 64 and 65. A pin 66 connects the other end of links 64 and 65 to the support 58. Pin 66 provides a fixed pivot point while pin 62 provides a movable pivot point. The pivot point 62 is free to move in an arc about the fixed pivot point 66 as the handle 56 is moved from a closed or locked position (FIG. 1) to an open or unlocked position (FIG. 2).

As best seen in FIG. 4, one end of the clamping pawl 54 is formed with a channel 55 therein to receive the end of handle 56. Pin 70 pivotally connects the handle 56 with the clamping pawl 54. The clamping pawl 54 is pivotally connected to supports 58 by a fixed pin 68. It is thus seen that the pivot pin 70 is free to move in an arc about the fixed pivot pin 68 from the closed or locked position (FIG. 1) to the open or unlocked position (FIG. 2).

The handle 56 is formed with a slot 74 at one end. A spring 72 is mounted in the slot 74 about the pivot pin 70. The spring 72 acts against the handle 56 and the clamping pawl 54. Hence, when the handle 56 is in the unlocked position (FIG. 2) the spring 72 acts to keep the handle 56 and clamping pawl 54 in the unlocked position to prevent interference with the adapter 12 as the adapter 12 and coupler 14 are brought into close proximity. As is seen in FIG. 2, in the unlocked position the clamping pawl 54 does not protrude into the bore portion 22.

Referring once again to FIG. 2, it can be seen that the clamping surface 76 of the clamping pawl 54 has a slight contour. In addition, in the open or unlocked position the clamping pawl 54 is extended out 90° from the closed or locked position. As the pawl 54 is moved to the closed position, the pawl 54 is able to pull the adapter 12 into the coupler housing 60 from a substantial distance. In other words, the adapter 12 and coupler 14 need not be abutted in order to lock the members together. Due to the double pivoting linkage, the clamping pawl 54 takes advantage of the mechanical advantage of the double pivot. The clamping pawl 54 moves rapidly at the beginning part of its motion and as it approaches the locked position, it continually slows down and gains the mechanical advantage which is almost the optimum motion that one would require for coupling things together. This is achieved by hinging the handle 56 on the links 64 and 65 about the pivot point 66. As the pivot pin 62 goes over the centerline drawn between pins 66 and 70, you gain the mechanical advantage. As the pin 62 moves beyond that centerline, the pin 62 actually moves negative and locks. This movement controls the pivot pin 70 which causes the clamping pawl 54 to pivot about pivot pin 68, thus causing the pivot pin 70 to move from its open position of FIG. 2 to the closed position of FIG. 1.

The coupler 14 is provided with a cylindrical bore 78 therein and a cylindrical sleeve 80 carried within the bore 78 for telescoping movements therealong. A seal 82 is secured on the outer terminal edge of the sleeve 80. In the flowthrough condition, the seal 82 will engage the surface 52 and provide a fluid seal therebetween. In the non-flow condition, the seal engages a complementally formed portion of a poppet 84 to provide a seal between the sleeve 80 and poppet 84 thereby preventing fluid flow through the coupler 14.

The poppet 84 has a stem 86 arranged generally coaxially with the sleeve 80. The stem 86 is threadably connected with a guide 88 mounted for sliding movement relative to the sleeve 80. The guide 88 insures proper alignment of the poppet 84 at all times. The poppet 84 is formed with a complementary face to receive a like face of poppet 38 as will be explained hereinbelow. Movement of the poppet 84 is controlled by suitable linkage connecting the stem 86 to the actuating means 18.

A spring 92 is provided for urging the cylindrical sleeve 80 outwardly. Hence the seal 82 is in continuous engagement with the poppet 84 until the seal 82 comes in contact with a restraining surface such as 52 of adapter 12. One end of the spring 92 engages a retaining ring 90 mounted in the bore 78. The other end of the spring 92 acts against flange 93 of an annular transition ring 94. The inner edge of the transition ring 94 engages a cooperating shoulder 95 of the cylindrical sleeve 80. In effect, the ring 94 extends the cylindrical bore of sleeve 80 within the coupler 14 while shielding a portion of the spring 92 to provide better support therefor and help prevent turbulence in the fluid flow. A plurality of guides or bearings 96 is carried at one end of the sleeve 80. The bearings 96 permit true axial movement of the sleeve 80 while helping to reduce the friction which would be generated if a sliding fit between the sleeve 80 and bore 78 was used. An O-ring seal 98 is provided between the bore 78 and sleeve 80 to assure that fluid leakage does not occur between such members. The seal 98 is held in place by a retainer 99 and retainer ring 100. Thus, when the adapter 12 is not in place as shown in FIG. 1, the telescoping cylindrical sleeve 80 is urged by spring 92 to follow the poppet 84 and maintain a fluid seal throughout the entire range of travel of the poppet 84. A gasket 102 is mounted in the terminal end portion 24 of the coupler 14. The gasket 102 cooperates with the surface 48 to provide a resilient seat to take up manufacturing tolerances when the adapter 12 and coupler 14 are engaged in the locked position.

The poppet 83 is connected to the actuating means 18 by a yoke 106. One end of yoke 106 is bifurcated to receive the end of stem 86. A pin 104 pivotally connects the stem 86 with the yoke 106. The pin 108 pivotally connects the other end of yoke 106 with a crank 110. The crank 110 is secured to and carried on a shaft 112. One end of the shaft 112 is carried for rotational movement in bearing 114. A stuffing box 116 is threaded into the housing 60 of coupler 14 for supporting the other end of the shaft 112. A bearing 118 is carried by the stuffing box 116. The shaft 112 extends through the bearing 118. Suitable fluid seals are provided by sealing members 120 and 122 to prevent leakage therethrough. A shoulder or the like 124 is secured on shaft 112 and cooperates with stops 126 to limit the outward axial movement of the shaft 112.

Shaft 112 protrudes beyond the housing 60 and is connected with an actuating handle 127. The end of the shaft 112 is threaded to receive a nut 128 to axially secure the handle 127 on the shaft 112. A clamp bolt 130 securedly fastens the handle 127 to the shaft 112 so that any rotational movement of the handle 127 is transmitted through the shaft 112, crank 110 and yoke 106 to the poppet stem 86. Handle projection 132 cooperatively engages stops 134 on the housing 60 to limit the rotational movement of the handle 127.

In operation, should the handle 127 be inadvertently rotated without the adapter 12 being secured to the coupler 14, the spring 92 will bias the sleeve 80 into continuous sealing engagement with the poppet 84 during the outward movement thereof. The handle 127 may be returned to the non-flowthrough position without the loss of any fluid. The coupler 14 is brought into close proximity with the adapter 12. The handles 56 are in the unlocked position (FIG. 2) and, hence, the clamping pawls 54 are maintained out of alignment with the bore 22. The terminal end portion 20 of the adapter 12 is then inserted into the bore 22 of the end portion 24 of the coupler 14. The handles 56 are then urged inwardly causing a pivoting movement of the links 64 and 65 and clamping pawls 54. The contoured clamping surface 76 of the clamping pawl 54 engages the surface 57 of the end portion 20 urging the adapter 12 and coupler 14 into a locking condition as shown in FIG. 1. As the handle 127 is now rotated, poppet 84 engages poppet 38 and seal 82 engages the face 52. The face 52 restricts further movement of the seal 82 and sleeve 80. The biasing force of the spring 92 maintains the seal 82 in sealing engagement with the face 52 so as to provide a fluid seal. Continued rotation of the handle 127 urges the poppet 84 forward so as to move the poppet 38 from its sealing or closed position shown in FIG. 1. The engaging faces of poppets 38 and 84 are complementally formed so that no fluid is trapped therebetween which might escape when the adapter 12 and coupler 14 are uncoupled and disengaged.

Another exemplary embodiment of this invention is illustrated in FIG. 5. Only a fragmentary view is illustrated showing essentially another embodiment of the fastening means. The fastening means is very similar to the fastening means 16; therefore, such fastening means will be designated generally by the reference numeral 16A and parts of the fastening means 16A which are very similar to corresponding parts of the fastening means 16 will be designated by the same reference numeral and also followed by the letter designation A and not described again. The main difference between the fastening means 16A and the fastening means 16 is in the clamping pawl 136. The clamping pawl 136 is formed to provide the clamping action on a radius 138 which is formed on the adapter housing 28A rather than the flat surface 57 of FIG. 1. In the embodiment of FIG. 5, the locked or clamped position is shown in solid lines and the unlocked or unclamped position is shown by dashed lines. When the handle 56A is moved from the locked position to the unlocked position, pivot pins 62A and 70A respectively move in arcs about fixed pivot pins 66A and 68A. In the unlocked position, the clamping pawl 136 does not interfere with the insertion or removal of the housing 28A from the end portion 24A.

In all instances, the terminal end portion 20 of the adapter 12 is provided with cut out or slotted portions therein. The width of the clamping pawls 54 is such that the slots are completely bridged by the clamping pawls or if one end of the clamping pawl extends over the cut out portion, the centerline of the clamping pawl is over the solid portion of the terminal end so that there is not an uneven loading in the locked position. At least one half of the clamping pawl is always on a solid surface to provide the necessary clamping force. It is obvious that the detailed material composition of each of the hereinabove described seals must be compatible with the type of fluid being handled and must have adequate sealing qualities over extended use. It should be further noted that the adapter 12 and coupler 14 are each adapted to be coupled to a fluid system.

Thus, it is seen that a dry-break coupler has been provided in which the cooperating members thereof which are coupled together can be coupled about a common axis irrespective of their individual angular position about such axis. Further, the members need not be in butting relationship to permit the coupling. The fastening means provided will permit the coupler member to be drawn relatively to the adapter end. Suitable sealing means prevent fluid loss during coupling and uncoupling.

While present exemplary embodiments of this invention have been illustrated and described, it will be recognized that this invention may be otherwise variously embodied and practiced by those skilled in the art.

What is claimed is:

1. In combination a dry-break coupler for use in a fluid system in which a coupler and an adapter are each connected to a fluid system and cooperate one with the other to form a dry-break coupling device, the coupler comprising a housing having a bore in the terminal end portion, an annular surface extending radially inward of said bore, said adapter having a terminal end portion adapted to be received within said bore in butting relation with said annular surface, at least a pair of handles, means double pivotally connecting each handle to said housing, said double pivot connecting means comprising a pair of stationary pivot points and a moveable pivot point positioned therebetween so that when the handles are in closed position the moveable pivot point is beyond a line extending between the two stationary pivot points to provide a locking effect on the handles, a clamping rigid pawl pivotally connected at one end of each handle, pivot means fixedly connecting each clamping pawl to said housing, each pawl having a contoured surface to provide clearance for receiving the terminal portion of said adapter and being cooperatively engageable with the terminal portion of the adapter to fasten the coupler and adapter together upon movement of each of said handles from an open to a closed position wherein each pawl is pivoted about said pivot means from a non-clamping condition to a clamping condition.

2. The dry-break coupler according to claim 1 in which each of said clamping pawls is formed with a slot therein for receiving one end of said handle, said clamping pawl and handle being connected by a pivot pin through said slotted end and handle end.

3. The dry-break coupler according to claim 2 in which said handle end is formed with a slot therein, a spring being mounted in said handle slot and about said pivot pin, said spring acting against said handle and said clamping pawl to hold said handle and clamping pawl in the unclamped position.

4. The dry-break coupler according to claim 3 in which each of said clamping pawls is of an elongate shape having an adapter engaging surface and in which the adapter is formed with a substantially flat clamping pawl receiving surface.

5. The dry-break coupler according to claim 4 in which said clamping pawl adapter engaging surface is contoured in shape to provide a line contact point for engagement with said adapter receiving surface as said clamping pawl is pivoted from the non-clamping position to the clamping position.

6. The dry-break coupler according to claim 3 in which said clamping pawl is formed with a contoured cam surface and the adapter is formed with a contour clamping pawl receiving surface wherein said cam surface cooperatively engages said contour receiving surface to effect coupling of said adapter and said coupler when said clamping pawl is moved from the non-clamping condition to the clamping condition.

7. The dry-break coupler according to claim 3 further comprising a gasket mounted in one end of said coupler housing for cooperative engagement with the outer face of said adapter to provide a resilient seat to take up manufacturing tolerances when in the coupled together condition.

* * * * *